United States Patent [19]

Terada et al.

[11] 4,367,026
[45] Jan. 4, 1983

[54] AUTOMATIC CAMERA

[75] Inventors: Katumi Terada, Hachioji; Yukio Nakajima, Kanagawa, both of Japan

[73] Assignee: Olympus Optical Company Ltd., Japan

[21] Appl. No.: 292,998

[22] Filed: Aug. 14, 1981

[30] Foreign Application Priority Data

Oct. 13, 1980 [JP] Japan ................................ 55-143281

[51] Int. Cl.³ ........................... G03B 1/12; G03B 1/66
[52] U.S. Cl. ..................................... 354/173; 354/217
[58] Field of Search ................ 354/173, 214, 215, 217, 354/218

[56] References Cited

U.S. PATENT DOCUMENTS

| | | | |
|---|---|---|---|
| 3,925,798 | 12/1975 | Sanada et al. | 354/217 X |
| 4,247,189 | 1/1981 | Date et al. | 354/173 |
| 4,251,148 | 2/1981 | Stemme et al. | 354/173 |
| 4,299,466 | 11/1981 | Harvey | 354/217 X |

FOREIGN PATENT DOCUMENTS 48-33296 of 1973 Japan .

*Primary Examiner*—Michael L. Gellner
*Attorney, Agent, or Firm*—Ostrolenk, Faber, Gerb & Soffen

[57] ABSTRACT

In an automatic camera, as a film roll is loaded, the film is once wound up to its terminal end in response to a signal which indicates the closure of a rear lid of the camera. During such time, the number of film perforations is counted to allow the number of film frames which are available to take pictures to be known before any pictures are taken. A display is provided which is decremented as the frames are exposed and the film is wound back, thus indicating the number of film frames remaining.

20 Claims, 4 Drawing Figures

4,367,026

AUTOMATIC CAMERA

BACKGROUND OF THE INVENTION

The invention relates to an automatic camera, and more particularly, to a camera in which a film is automatically fed.

As is well recognized, there are a variety of photographic films which can be used to take pictures. In addition, the number of frames contained in a single continuous length of film and on which pictures can be taken vary from film to film.

By way of example, 35 mm wide film rolls having perforations which are commonly used in ordinary cameras include a variety of numbers of frames such as 12, 20, 24, 36 frames and the like. This makes it difficult to assure that a user of the camera be certain about the variety of a particular photographic film loaded in a camera as to how many frames it contains. In particular, when the camera has been left out of use for an increased length of time after the film has been loaded, there is a difficulty in ascertaining how many unexposed frames are available.

Even if a particular film has an indication printed or marked thereon as to the number of frames available, the actual number of frames which can be used to take pictures may slightly vary depending on makers and cameras into which the film is loaded. In the very common case, the exact number of frames cannot be known until the full exposure of the film has been completed. Thus, there is an inconvenience that the number of available frames cannot be known beforehand.

SUMMARY OF THE INVENTION

In view of the foregoing, it is an object of the invention to provide an automatic camera in which when a film roll is loaded, the film is once wound up until its terminal end is reached while counting the number of perforations so as to permit the number of available frames to be known beforehand.

In accordance with the invention, the number of available frames can be exactly known at the time a film is loaded in a camera. The initial count is decremented for a film rewind for a length corresponding to one frame, so that even when the camera is left without use for a prolonged period of time, the number of remaining available frames can be exactly indicated.

DESCRIPTION OF PREFERRED EMBODIMENT

Figure 1:
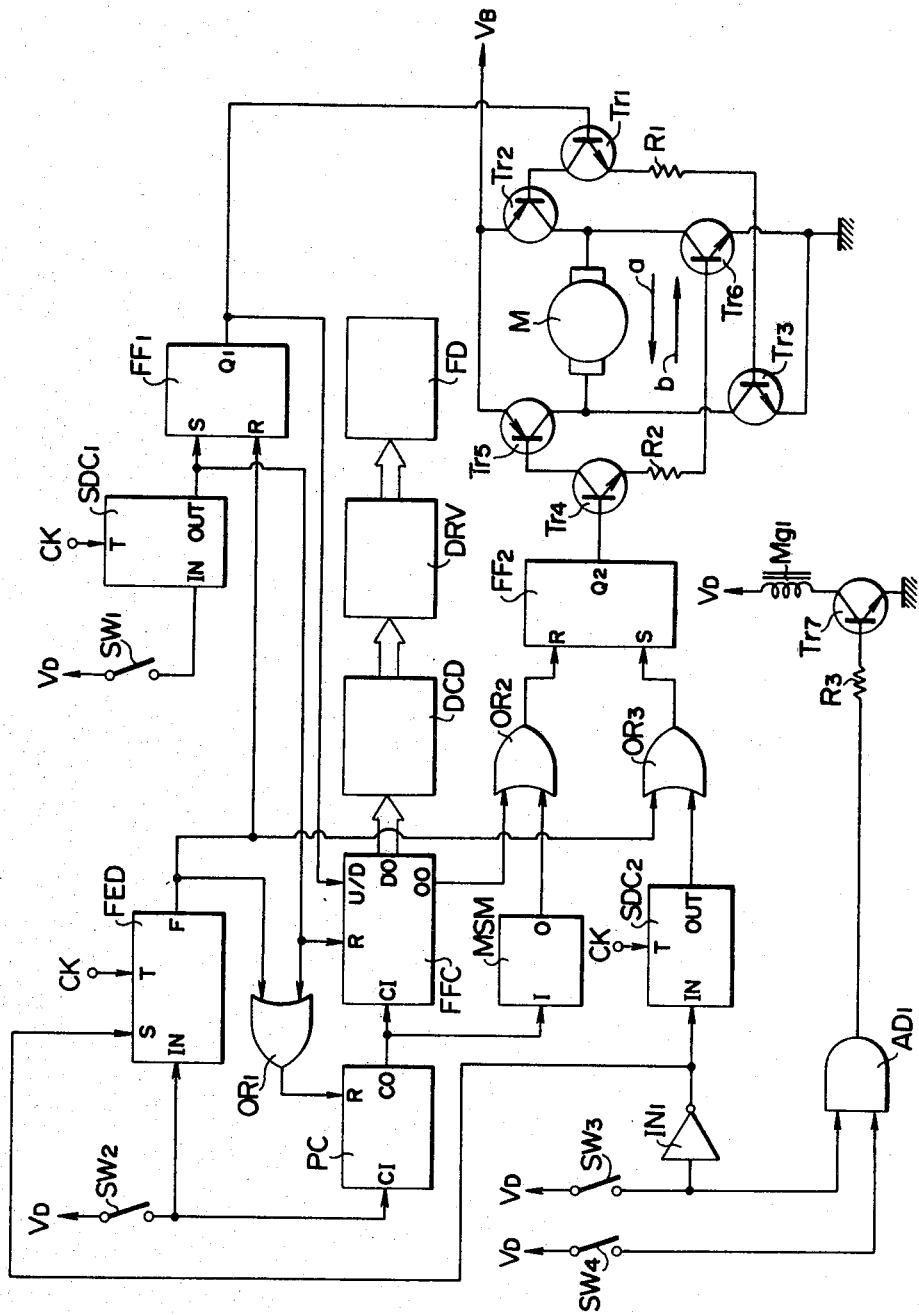
FIG. 1 is a circuit diagram of an automatic camera according to one embodiment of the invention.

FIG. 1 shows the electrical circuit of an automatic camera according to one embodiment of the invention. The electrical circuit essentially comprises four switches including a rear lid interlock switch SW1, a perforation detecting switch SW2, a shutter charge switch SW3 and a shutter release switch SW4; a film feed motor M; a film end detecting circuit FED; a perforation counter PC; film frame number counter FFC; and a pair of flipflops FF1, FF2 for controlling the motor.

The rear lid interlock switch SW1 is adapted to be turned on and off in interlocked relationship with the opening and closing of a rear lid, and has its one end connected to a voltage source VD and its other end connected to an input terminal IN of synchronous differentiator SDC1. When the rear lid is closed, the switch is turned on to apply a high level lid close signal to the input terminal IN of the differentiator SDC1. In response to the application of a high level signal to its input IN, the differentiator SDC1 produces a differentiated pulse at its output terminal OUT in synchronized relationship with a clock pulse CK applied to its clock signal terminal T. The output terminal OUT of the differentiator is connected to the set terminal S of the flip-flop FF1, the reset terminal R of the film frame number counter FFC, and also fed through OR circuit OR1 to the reset terminal R of the perforation counter PC.

The flipflop FF1 comprises an RS-flipflop which is well known, having its reset terminal R connected to the output terminal F of the film end detector circuit FED. The flipflop FF1 has an output terminal Q1 which is connected to a control terminal U/D of the film frame number counter FFC and is also connected to the base of a transistor Tr1. The flipflop FF1 conditions the frame number counter FFC for count-up or count-down operation, and also turns transistor Tr1 on, causing the motor M to rotate in a forward direction, indicated by an arrow a in FIG. 1, to perform an initial film winding operation.

The perforation detecting switch SW2 comprises a pair of conductive blades disposed in opposing relationship with each other on the opposite sides of a lateral edge of a film where perforations are formed so that the switch is repeatedly opened and closed as one of the perforations passes therebetween during a film feed operation. It should be understood that the perforation detecting switch SW2 is not limited to a mechanical switch, but may be replaced by optical or magnetic perforation detecting means. The switch SW2 has its one end connected to a voltage source VD and its other end connected to an input terminal IN of the film end detector FED and an input terminal CI of the perforation counter PC.

The film end detector FED has its output terminal F connected to the reset terminal R of the flipflop FF1 and is also connected through OR circuit OR1 to the reset terminal R of the perforation counter PC, and also connected through an OR circuit OR3 to the set terminal S of the flip-flop FF2. The detector FED has a control terminal S which is connected to the output terminal of an inverter IN1, to be described later, while a clock pulse CK is normally applied to its clock signal terminal T. The detector FED operates to detect the end of an initial film winding operation, causing the rotation of the film winding motor M to be interrupted.

Figure 2:
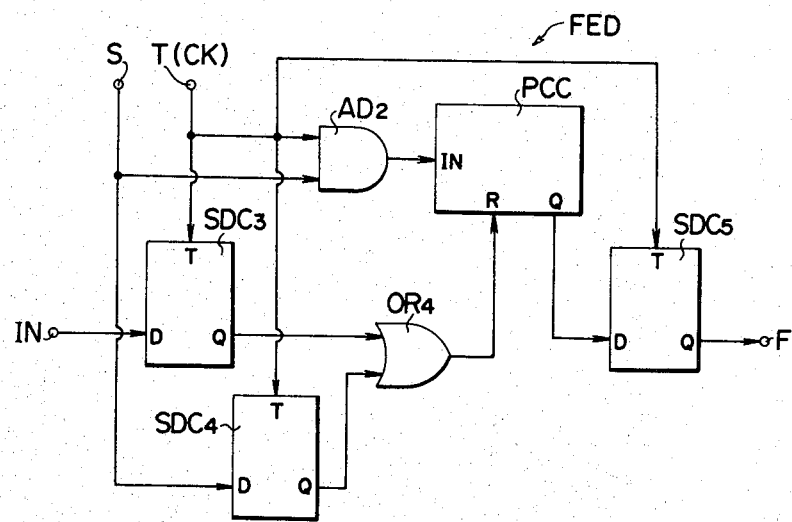
FIG. 2 is a circuit diagram, showing a film end detector circuit in more detail.

FIG. 2 shows the detail of the film end detector FED. Specifically, it comprises three synchronous differentiators SDC3–SDC5, a pulse counter PCC, AND circuit AD2 and OR circuit OR4. The first synchronous differentiator SDC3 has an input terminal D which is connected to the input terminal IN of the film end detector FED while its output terminal Q is connected through OR circuit OR4 to the reset terminal R of the pulse counter PCC. The second synchronous differentiator SDC4 has an input terminal D which is connected to the control terminal S of the detector FED and has an output terminal Q which is connected through OR circuit OR4 to the reset terminal R of the pulse counter PCC. The control terminal S is connected to one input of AND circuit AD2, the other input of which is connected to the clock signal terminal T of the detector FED. The output terminal of AND circuit AD2 is connected to the input terminal IN of the pulse counter PCC. The pulse counter PCC has an output terminal Q which is connected to the input terminal D of the third synchronous differentiator SDC5, the output terminal Q of which is connected to the output terminal F of the detector FED. Each clock signal terminal T of the synchronous differentiators SDC3–SDC5 is connected to the clock signal terminal T of the detector FED.

Describing the operation of the film end detector FED, during an initial film winding operation, as a perforation pass signal is applied to the input terminal IN from the perforation detecting switch SW2, the pulse counter PCC is intermittently reset, producing a low level at its output terminal F. At the end of the initial film winding operation, the pulse counter PCC is released from its reset condition, and is allowed to initiate counting the clock pulse CK. When a given number of clock pulses CK are counted by the pulse counter PCC, the output of the latter changes to a high level, which is converted by the synchronous differentiator SDC5 into a differentiated pulse produced at the output terminal F, which interrupts a further rotation of the motor M. At the end of rewinding the film by a length corresponding to one frame after a picture has been taken, the shutter charge switch SW3 (FIG. 1) is closed, whereby a low level signal is applied to the control terminal S, this inhibiting the supply of the clock pulse CK to the pulse counter PCC through AND circuit AD2. Hence, the output of the pulse counter PCC remains unchanged. Consequently, no differentiated pulse is produced which causes the rotation of the motor M to be interrupted.

Returning to FIG. 1, the perforation counter PC is arranged to produce a single pulse output in response to its having counted a number of perforations corresponding to one frame, which is usually eight in number for a usual 35 mm film roll. Its output terminal CO is connected to the input CI of the frame number counter FFC and to the input terminal I of a monostable multivibrator, the output terminal O of which is connected through OR circuit OR2 to the reset terminal R of the flipflop FF2.

As mentioned previously, the frame number counter FFC is an up-down counter which may be enabled for a count-up or count-down operation. When a high level signal is applied to its control signal U/D, it is enabled to operate as a count-up counter while it operates as a count-down counter in response to a low level signal applied to the control terminal U/D. The frame number counter FFC has a data output terminal DO which is connected through a decoder DCD and a driver DRV to a frame number display FD, thus allowing the display FD to indicate the count in the counter FFC. The counter also has a zero count output terminal OO, which is connected through OR circuit OR2 to the reset terminal R of the flipflop FF2. When the count in the counter FFC reaches zero, a high level signal is produced at the output terminal OO.

The shutter charge switch SW3 is mechanically interlocked with a shutter charging mechanism, and is closed upon completion of a shutter charging operation. The switch SW3 has its one end connected to a voltage source VD and its other end connected to the input terminal of the inverter IN1 and one input of AND circuit AD1. The other input of AND circuit AD1 is connected to one end of the shutter release switch SW4 which has its other end connected to a voltage source VD. The output terminal of AND circuit AD1 is connected through a resistor R3 to the base of a control transistor Tr7, formed by an NPN transistor for controlling the energization or deenergization of a release electromagnet Mg1. The transistor Tr7 has its collector connected through the electromagnet Mg1 to the voltage source VD and has its emitter connected to the ground. When the transistor Tr7 is turned on, the electromagnet Mg1 is energized, causing a shutter release.

The output terminal of the inverter IN1 is connected to the control terminal S of the film end detector FED and is also connected to the input terminal IN of the synchronous differentiator SDC2. When a high level signal is applied to its input terminal IN, the synchronous differentiator SDC2 operates to produce a differentiated pulse at its output terminal OUT in synchronized relationship with the clock pulse CK applied to its clock signal terminal T. The output terminal OUT is connected through OR circuit OR3 to the set terminal S of the flipflop FF2. The flipflop FF2 is a reset dominating or RS flipflop, and has an output terminal Q2 which is connected to the base of a transistor Tr4. The purpose of the flipflop FF2 is to turn the transistor Tr4 on to cause the motor M to rotate in the opposite direction or in a direction indicated by an arrow b in FIG. 1, thus controlling a film rewind corresponding to one frame.

The film feed motor M is a reversible d.c. motor, and is associated with a drive control circuit which is formed by six transistors Tr1–Tr6 and two resistors R1, R2. The transistor Tr1 is an NPN transistor having its collector connected to the base of PNP transistor Tr2 and its emitter connected through resistor R1 to the base of NPN transistor Tr3. The emitter of transistor Tr2 is connected to a drive source VB while its collector is connected to one end of the motor M, the other end of which is connected to the collector of the transistor Tr3 which has its emitter connected to the ground. The transistor Tr4 is of an NPN type and has its collector connected to the base of PNP transistor Tr5 and its emitter connected through resistor R2 to the base of NPN transistor Tr6. The emitter of the transistor Tr5 is connected to the drive source VB while its collector is connected to the other end of the motor M. The collector of the transistor Tr6 is connected to one end of the motor M and its emitter is connected to the ground.

It will be appreciated that when the transistor Tr1 is turned on, the both transistors Tr2, Tr3 are also turned on to cause the motor M to rotate in the forward direction, indicated by the arrow a. However, when the transistor Tr4 is turned on, the transistors Tr5, Tr6 are turned on also, causing the motor to rotate in the opposite direction indicated by the arrow b.

Figure 3:
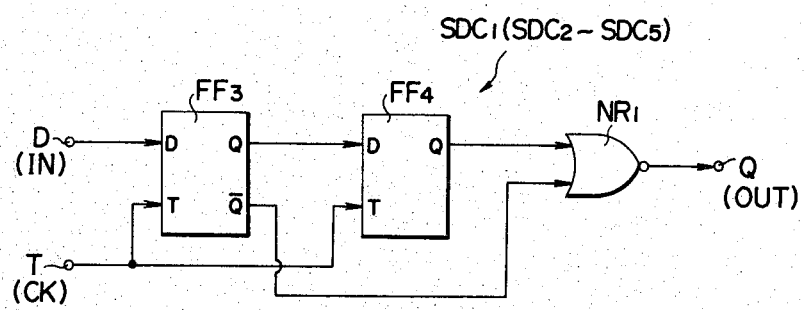
FIG. 3 is a circuit diagram of a synchronous differentiator in detail.

The synchronous differentiators SDC1–SDC5 are similarly constructed, and one of them is illustrated in FIG. 3. Specifically, the synchronous differentiator SDC1, which is typical also of other differentiators SDC2–SDC5, comprises a pair of edge triggered or D-type flipflops FF3, FF4, and NOR circuit NR1. The input terminal D (IN) is connected to the input terminal D of the first stage flipflop FF3 while the clock signal terminal T is connected to the clock signal terminals T of the both flipflops FF3, FF4. The output terminals Q, $\overline{Q}$ of the first stage flipflop FF3 are connected to the input terminal D of the second stage flipflop FF4 and one input of NOR circuit NR1, respectively. The second stage flipflop FF4 has an output terminal Q which is connected to the other input of NOR circuit NR1, the output terminal of which is connected to the output terminal Q (OUT) of the synchronous differentiator SDC1 (SDC2–SDC5).

Describing the operation of the synchronous differentiators SDC1–SDC5, when a high level signal is applied to the input terminal D (IN), the output terminal $\overline{Q}$ of the flipflop FF3 inverts from its high to its low level in synchronism with the initial rising end of the clock pulse CK, whereby the output of NOR circuit NR1 inverts to its high level. The output terminal Q of the flipflop FF4 changes from its low to its high level in synchronism with the rising end of the next clock pulse CK, whereby the output of NOR circuit NR1 inverts to its low level. Accordingly, when a high level signal is applied to the input terminal D (IN), there is produced a differentiated pulse in synchronism with the clock pulses CK which has a time duration from the rising end of the first clock pulse CK to the rising end of the next clock pulse CK.

Figure 4:
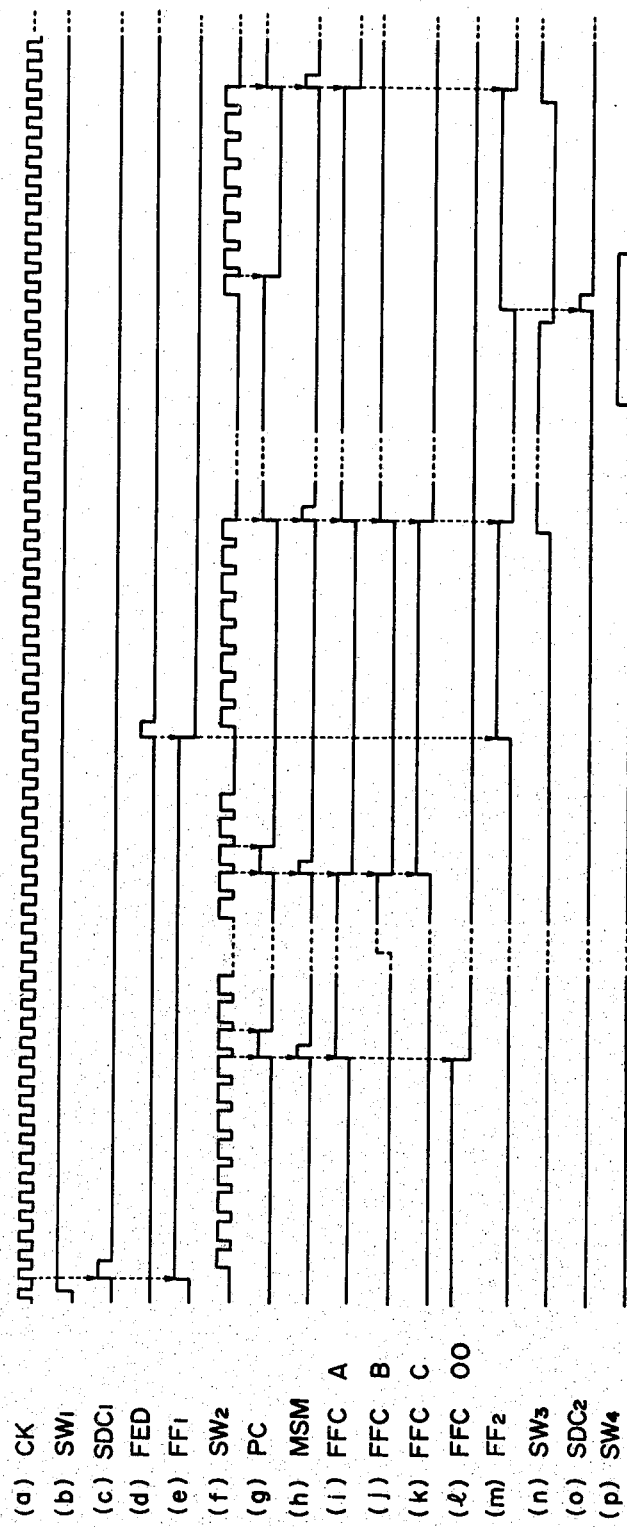
FIGS. 4(a) to (p) are a series of timing charts illustrating the operation of various parts of the circuit shown in FIG. 1.

The operation of the automatic camera will now be described with reference to a series of timing charts shown in FIG. 4. Initially, the rear lid of the camera is opened to load the film roll. Upon closure of the rear lid, the rear lid interlock switch SW1 is turned on as indicated in FIG. 4(b), and the synchronous differentiator SDC1 produces a high level differentiated pulse, as indicated in FIGS. 4(a) and (c). In response to the differentiated pulse, both the perforation counter PC and frame number counter FFC are reset, and the output of the flipflop FF1 changes from its low to its high level, as shown in FIG. 4(e), causing a high level signal to be applied to the control terminal U/D of the frame number counter FFC, which is then enabled for a count-up operation. At the same time, a high level signal is applied to the base of the transistor Tr1, which is therefore turned on as are the transistors Tr2, Tr3, causing the motor M to rotate in the forward direction, indicated by the arrow a, initiating a continuous film winding operation until its terminal end is reached.

As the film is being fed during the film winding operation, the perforation detecting switch SW2 is intermittently turned on as the perforations pass it, as indicated in FIG. 4(f). In this manner, the perforation counter PC counts a high level perforation pass signal until the number of such pulses reaches eight, whereupon a single output pulse signal is produced, as shown in FIG. 4(g). This pulse signal is counted by the frame number counter FFC as a signal which indicates one frame of the film (see FIG. 4(i)). The pulse signal is also supplied to the monostable multivibrator MSM, which produces a single pulse as indicated in FIG. 4(h), but which pulse remains without effect since a low level prevails at the set terminal S of the flipflop FF2. In this manner, as the film is being wound up, the perforation counter PC produces a pulse signal in response to eight perforations, and such pulse signal is counted by the frame number counter FFC to increase the number of frames counted thereby.

When the film has been wound up to its terminal end, the film ceases to be fed forward since a trailer of the film is secured to a film supply shaft disposed within a film magazine, causing the motor M to idle. When the film ceases to be fed forward, the perforation detecting switch SW2 ceases to be turned on and off, as indicated in FIG. 4(f). Obviously, the perforation counter PC stops and the perforation pass signal ceases to be supplied to the input terminal IN of the film end detector FED.

In the electrical circuit of FIG. 2, when the intermittent supply of the input signal to the input terminal IN of the detector FED ceases, the reset signal ceases to be supplied to the reset terminal R of the pulse counter PCC through OR circuit OR4, and then the pulse counter PCC begins counting the clock pulses CK which are fed through AND circuit AD2. When the count in the pulse counter PCC reaches a given value, it produces a high level signal at its output terminal Q, which is converted by the synchronous differentiator SDC5 into a pulse-shaped signal indicative of the detection of the film end shown in FIG. 4(d), which is produced at the output terminal F of the detector FED. In response to the film end signal, the flipflop FF1 changes its output from a high to a low level, as shown in FIG. 4(e), turning the transistors Tr1–Tr3 off to stop the rotation of the motor M in the forward direction. This completely terminates the film winding operation which has been continued until its terminal end is reached.

At the same time, the low level output from the flipflop FF1 enables the frame number counter FFC for a countdown operation. Also, the film end signal from the detector FED resets the perforation counter PC, and the output from the flipflop FF2 changes from its low to its high level, as shown in FIG. 4(m). This turns the transistor Tr4 on as are the transistors Tr5, Tr6 allowing the motor M to rotate in the opposite direction or in the direction indicated by the arrow b. This initiates a film rewind operation. It should be understood that the motor M is also connected to a shutter charging mechanism, and hence a shutter charging operation occurs simultaneously during a film rewind operation.

As the film is rewound, the perforation detecting switch SW2 is repeatedly turned on and off as perforations pass it, as indicated in FIG. 4(f). The perforation counter PC counts this perforation pass signal. When eight signals are counted, the counter PC produces a high level output as indicated in FIG. 4(g), which output causes the count in the frame number counter FFC to be decremented by one. At the same time, a pulse output from the monostable multivibrator MSM is applied through OR circuit OR2 to the reset terminal R of the flipflop FF2, as indicated in FIG. 4(h), whereby the output of the flipflop FF2 changes from its high to its low level as shown in FIG. 4(m), turning the transistors Tr4–Tr6 off to stop the rotation of the motor M which has been utilized to rewind the film. It is to be understood that the shutter charging operation is completed at the time when the rotation of motor M is interrupted, whereby the shutter charge switch SW3 is turned on as indicated in FIG. 4(n). Consequently, the film rewind operation which followed the film winding to its terminal end is interrupted under the condition that the film has been rewound by a length corresponding to one frame. Since the shutter is charged under this condition, the camera can be used to take a picture by the closure of the shutter release switch SW4. In other words, the camera is in its standby mode.

During such standby mode, the shutter charge switch SW3 is turned on, and the output of the inverter IN1 applies a low level signal to the control terminal S of the detector FED. Accordingly, in the electrical circuit of FIG. 2, AND circuit AD2 has one input which is at its low level, thus preventing the clock pulse CK from being supplied to the pulse counter PCC. Accordingly, the film end detector FED remains inoperative, and cannot produce a film end signal again if the perforation detecting switch SW2 ceases to be turned on and off (see FIG. 4(d)).

In the standby mode, the content of the frame number counter FFC is fed through the decoder DCD and driver DRV to be indicated by the display FD as an indication of available frames for taking pictures. Consequently, a user of the camera is enabled to know how many frames are available from the loaded film at the time the film has been loaded.

The operation of the automatic camera when taking a picture will now be described. In response to the depression of a shutter release button, the shutter release switch SW4 is closed as indicated in FIG. 4(p). This enables AND circuit AD1 to permit the close signal from the shutter release switch SW4 to be applied to the base of the transistor Tr7. Hence, transistor Tr7 is turned on to energize the shutter release electromagnet Mg1, initiating a shutter operation.

When a shutter operation is completed and a shutter is no longer charged, the shutter charge switch SW3 is turned off as indicated in FIG. 4(n), causing the inverter IN1 to apply a high level signal to the input terminal IN of the synchronous differentiator SDC2. The differentiator SDC2 produces a differentiated output as shown in FIG. 4(o), which is supplied through OR circuit OR3 to the set terminal S of the flipflop FF2. Accordingly, the output of the flipflop FF2 changes from its low to its high level as shown in FIG. 4(m), turning the transistors Tr4–Tr6 on to cause the motor M to rotate in the opposite direction or in the direction of the arrow b, thus initiating a film rewind operation.

Subsequently, the rotation of the motor M is interrupted after a length of the film has been wound up which corresponds to one frame, in the same manner as the film rewind operation which occurred in succession to the film winding to its terminal end, and the camera enters its standby mode while the shutter is charged. It should be understood that the indication provided by the display FD is decremented by one from its previous value.

In this manner, a shutter operation occurs for each closure of the shutter release switch SW4, causing the film to be rewound by a length corresponding to one frame. In this manner, the exposure of film frames occurs from one located close to the film trailer toward the one located adjacent to the film leader. It will be noted that this is a progression in the opposite direction from that occurring in a usual camera, but this presents no problem whatsoever.

When successive pictures are taken and the film is rewound to a position which corresponds to that when it is initially inserted into the camera, the count in the frame number counter FFC reaches zero, producing a high level signal at its zero count output terminal OO. This signal is applied through OR circuit OR2 to the reset terminal R of the flipflop FF2, whereby its output changes from its high to its low level. This stops the rotation of the motor M. Accordingly, if the shutter is released subsequently to apply a high level signal to the set terminal S of the flipflop FF2, it cannot be set to cause a rotation of the motor M.

In the manner mentioned above, a number of available frames have been subject to an exposure, and hence the rear lid of the camera may be opened to remove the exposed film outside the camera. Obviously, film rewind means, not shown, may be provided to remove the film after the film leader has been completely received within the film magazine.

FIGS. 4(i)–(l) indicate the output conditions of the frame number counter FFC. Specifically, FIG. 4(i) represents the output for the least significant bit A at the data output terminal DO. Similarly, FIGS. 4(j) and (k) represent the output for the second and the third bit B, C at the output terminal DO while FIG. 4(l) indicates the output for zero count output terminal OO. While the number of bits in the data output terminal DO is not limited to three and may include more significant bits, the output condition of the latter can be easily understood and hence will not be described. It should be understood that the condition of the bits A to C at the end of the film winding operation depends on the number of frames of the film used, and hence remains to be exemplary only.

In the described embodiment, the single motor is utilized to perform a film winding, a film rewind and a shutter charging operation. However, each of such operations may be performed by a separate and individual motor.

What is claimed is:

1. An automatic camera comprising
   a rear lid interlock switch adapted to be turned on and off in response to the opening and closing of a rear lid of a camera;
   a film winding motor responsive to a rear lid close signal from the rear lid interlock switch for causing a film loaded into the camera to be wound up once until its terminal end is reached;
   perforation detecting means for producing a film passage signal in response to the passage of perforations in the loaded film as the film is wound by the winding motor;
   a counter responsive to said film passage signal for counting the number of perforations as the film is wound; and
   a frame number memory for storing a number corresponding to the number of frames of the loaded film, the number of frames being calculated in response to the number of perforations counted by the counter.

2. An automatic camera according to claim 1 in which the film winding motor is also used as a film rewind motor.

3. An automatic camera according to claim 1 in which the number of film frames stored in the frame number memory is decremented by one each time the film is rewound by a length corresponding to one frame, in response to the film passage signal from the perforation detecting means.

4. An automatic camera according to claim 1 in which the frame number memory is connected to a frame number display means for display the number of film frames stored in the memory is indicated by the display.

5. An automatic camera according to claim 1 in which the frame number memory is cleared by a lid open signal from the rear lid interlock switch.

6. An automatic camera according to claim 1, wherein said control means includes a motor control flipflop which assumes a first state upon completion of an exposure of a film surface to cause a film rewind motor to rotate through a stroke corresponding to one frame of the film, at the completion of which the flipflop changes to a second state, thus stopping the motor.

7. An automatic camera according to claim 6 in which the motor control flipflop changes to the second state to maintain the film rewind motor stationary when the frame number stored in the frame number memory, which is decremented by one each time the film is rewound by one frame, reduces to a given value.

8. An automatic camera according to claim 6 in which the motor control flipflop comprises a reset dominating RS flipflop.

9. An automatic camera according to claim 6 in which a shutter is charged as the film rewind motor rewinds one frame of the film.

10. An automatic camera according to claim 9, further including a shutter charge switch which is turned on upon completion of a shutter charging operation and a shutter release electromagnet which can be activated only when the shutter charge switch is turned on.

11. A film winding apparatus for a camera, said apparatus comprising:
(A) a rear lid interlock switch for generating a rear lid close signal in response to the closing of a rear lid of a camera;
(B) a film winding motor for winding a film loaded in said camera;
(C) perforation detecting means for producing a perforation pass signal in response to the passage of perforations in said load film past a predetermined location in said camera;
(D) a frame number memory; and
(E) control means for:
 (1) causing said motor to wind said film loaded in said camera in a first direction and substantially through its entire length until said film reaches an end thereof in response to said rear lid close signal; and
 (2) determining the number of frames in said film as it is wound by said motor as a function of said perforation pass signal and storing a number corresponding to said number of frames in said frame number memory.

12. The apparatus of claim 11, wherein said control means also causes said motor to rewind said film in a second direction, opposite to said first direction, one frame at a time.

13. The apparatus of claim 12, wherein said control means causes said motor to rewind said film by a distance equal to one said frame each time said camera completes a shutter release operation thereof.

14. The apparatus of claim 13, wherein said control means reduces said number stored in said frame number memory by one each time it causes said motor to rewind said film a distance equal to one frame.

15. The apparatus of claim 14, wherein said control means determines when said motor has rewound said film a distance equal to one said frame as a function of said perforation pass signal.

16. The apparatus of claim 14, wherein said control means disables said motor when the frame number stored in said frame number memory reduces to a given value.

17. The apparatus of claim 11, further including frame number display means coupled to said memory for indicating said number of film frames stored in said memory.

18. The apparatus of claim 11, wherein said rear lid interlock switch also generates a rear lid open signal in response to the opening of said rear lid of said camera and wherein said control means clears the number stored in said frame number memory in response to said lid open signal.

19. The apparatus of claim 11, wherein said motor also charges a shutter of said camera each time it rewinds said film one said frame.

20. The apparatus of claim 18, further including a shutter charge switch which is turned on when said shutter is charged by said motor and a shutter release electromagnet which can be activated only when said shutter charge switch is turned on.

* * * * *